(12) United States Patent
Biswas et al.

(10) Patent No.: US 11,780,115 B2
(45) Date of Patent: Oct. 10, 2023

(54) MULTI-PIECE LAYERED HONEYCOMB EXTRUSION DIES AND METHODS OF MAKING SAME

(71) Applicant: CORNING INCORPORATED, Corning, NY (US)

(72) Inventors: Samir Biswas, Horseheads, NY (US); Memduh Volkan Demirbas, Ithaca, NY (US); Ryan Joseph Grohsmeyer, Addison, NY (US); Mark Lee Humphrey, Burdett, NY (US); Zakariya Radwan Khayat, State College, PA (US); Kenneth Richard Miller, Addison, NY (US)

(73) Assignee: Corning Incorporated, Corning, NY (US)

( * ) Notice: Subject to any disclaimer, the term of this patent is extended or adjusted under 35 U.S.C. 154(b) by 252 days.

(21) Appl. No.: 17/103,524

(22) Filed: Nov. 24, 2020

(65) Prior Publication Data
US 2021/0154885 A1    May 27, 2021

Related U.S. Application Data

(60) Provisional application No. 62/941,068, filed on Nov. 27, 2019.

(51) Int. Cl.
*B29C 48/00* (2019.01)
*B28B 3/26* (2006.01)

(52) U.S. Cl.
CPC .................... *B28B 3/269* (2013.01)

(58) Field of Classification Search
CPC ......... B29C 48/11; B29C 48/00; B28B 3/269; B28B 3/26; B28B 3/20; B23P 15/243; B23P 15/24
See application file for complete search history.

(56) References Cited

U.S. PATENT DOCUMENTS 9,616,637 B2   4/2017  Hosokawa et al.
9,950,442 B2   4/2018  Hayashi
(Continued)

FOREIGN PATENT DOCUMENTS

JP   2006-021211 A   1/2006
JP   2007-237248 A   9/2007

OTHER PUBLICATIONS

Kreith, Frank Goswami, D. Yogi. (2004). CRC Handbook of Mechanical Engineering (2nd Edition)—12.7.2.2 Structural Ceramics. Taylor & Francis. (Year: 2004).*

(Continued)

*Primary Examiner* — Susan D Leong
*Assistant Examiner* — John W Hatch
(74) *Attorney, Agent, or Firm* — Joseph M. Homa

(57) ABSTRACT

Extrusion dies and methods of manufacturing extrusions dies, the extrusion die including a first plate and a second plate. The first plate has first upstream and downstream surfaces. A first material of the first plate has a first elastic modulus. The first plate includes pins formed between a plurality of slots. The pins and slots define a discharge face for the extrusion die at the first downstream surface of the first plate. The second plate has second upstream and downstream surfaces. The second plate is joined at the second downstream surface to the first upstream surface of the first plate. A second material of the second plate has a second elastic modulus. The second elastic modulus is greater than the first elastic modulus. A plurality of feed holes extend from the second upstream surface of the second plate through the extrusion die into communication with the slots.

13 Claims, 8 Drawing Sheets

(56) References Cited

U.S. PATENT DOCUMENTS

| | | | |
|---|---|---|---|
| 2002/0152603 A1* | 10/2002 | Asai | B28B 7/346 |
| | | | 29/527.2 |
| 2006/0034972 A1 | 2/2006 | Takahashi et al. | |
| 2009/0061040 A1 | 3/2009 | Hayashi et al. | |
| 2010/0074982 A1 | 3/2010 | Takahashi | |
| 2010/0143529 A1 | 6/2010 | Kitamura et al. | |
| 2014/0017509 A1 | 1/2014 | Takahashi et al. | |
| 2015/0086670 A1* | 3/2015 | Kitamura | B23P 15/243 |
| | | | 425/461 |
| 2015/0137431 A1* | 5/2015 | Hayashi | C04B 35/565 |
| | | | 425/467 |
| 2017/0173574 A1* | 6/2017 | Enoshita | B28B 3/269 |
| 2018/0043597 A1* | 2/2018 | Imaizumi | B28B 3/269 |

OTHER PUBLICATIONS

Kevin Doherty, "Large Area Active Brazing of Multi-tile Ceramic-Metal Structures", Proceedings From the 5th International Brazing and Soldering Conference, Apr. 2012, 8 pages.

* cited by examiner

MULTI-PIECE LAYERED HONEYCOMB EXTRUSION DIES AND METHODS OF MAKING SAME

CROSS REFERENCE TO RELATED APPLICATIONS

This application claims the benefit of priority under 35 U.S.C. § 120 of U.S. Provisional Application Ser. No. 62/941,068 filed on Nov. 27, 2019, the content of which is relied upon and incorporated herein by reference in its entirety.

FIELD

The present disclosure relates to extrusion dies. In particular, the present disclosure relates to multi-piece layered honeycomb extrusions dies having increased elastic modulus and methods of manufacturing the same.

BACKGROUND

Extrusion dies are useful in forming cellular or honeycomb ceramic bodies for a variety of purposes, such as catalytic converters and particulate filters, which are utilized in exhaust systems of internal combustion engines. Formation of some ceramic honeycomb bodies involves extruding a ceramic-forming mixture through a matrix of slots defined by rows of pins within a honeycomb extrusion die.

BRIEF SUMMARY

The present disclosure is directed to honeycomb extrusion dies having increased elastic moduli. The extrusion dies according to embodiments disclosed herein are constructed from a first plate and a second plate joined together. The first plate can be formed from a metal, and the second plate can be formed from a high-elastic modulus material, such as a ceramic or metal matrix composite. The first plate includes a plurality of pins formed between a plurality of slots. The pins and slots define a discharge face for the extrusion die. The second plate is an upstream plate that includes a plurality of feedholes for feeding batch material into the first plate, through the slots, and out the discharge face of the extrusion die. The high elastic modulus of the second plate increases the effective elastic modulus of the extrusion die such that the die can withstand high extrusion pressures without experiencing elastic deflection of the die. Such elastic deflection can cause flowering, or splaying, of the pins, which can result in undesirable geometries for an extruded honeycomb product.

Some embodiments are directed to an extrusion die, comprising a first plate having a first upstream surface and a first downstream surface, the first plate formed of a first material having a first elastic modulus and comprising a plurality of pins formed between a plurality of slots, the plurality of pins and the plurality of slots defining a discharge face for the extrusion die at the first downstream surface of the first plate; a second plate having a second upstream surface and a second downstream surface, wherein the second plate is joined at the second downstream surface to the first upstream surface of the first plate, the second plate being formed of a second material having a second elastic modulus; and a plurality of feed holes extending from the second upstream surface of the second plate through the extrusion die into communication with the slots, wherein the second elastic modulus is greater than the first elastic modulus.

In some embodiments, the plurality of feed holes comprise first feedhole portions in the first plate and second feedhole portions in the second plate.

In some embodiments, the slots extend from the first downstream surface of the first plate toward the first upstream surface of the first plate, and the first feedhole portions of the plurality of feed holes in the first plate extend from the first upstream surface of the first plate toward the first downstream surface of the first plate; and the second feedhole portions of the plurality of feed holes in the second plate extend through the second plate from the second upstream surface of the second plate to the second downstream surface of the second plate.

In some embodiments, the first upstream surface of the first plate is directly joined to the second downstream surface of the second plate.

In some embodiments, a first average diameter of the first feedhole portions of the plurality of feed holes in the first plate is larger than a second average diameter of the second feedhole portions of the plurality of feed holes in the second plate.

In some embodiments, a first average diameter of the first feedhole portions of the plurality of feed holes in the first plate is in a range of 5% to 15% larger than a second average diameter of the second feedhole portions of the plurality of feed holes in the second plate.

In some embodiments, the second elastic modulus is 50% or more greater than the first elastic modulus.

In some embodiments, the first material comprises a metal.

In some embodiments, the first material comprises stainless steel.

In some embodiments, the second material comprises a ceramic.

In some embodiments, the second material comprises aluminum oxide.

In some embodiments, the second material comprises a metal matrix composite.

In some embodiments, the second material comprises tungsten carbide-cobalt.

In some embodiments, the extrusion die further comprises an effective die elastic modulus of 250 GPa or more.

In some embodiments, a coefficient of thermal expansion of the second material is from 50% to 150% of a coefficient of thermal expansion of the first material.

In some embodiments, the extrusion die further comprises an overall die diameter in a range of 9.25 inches to 18.25 inches.

In some embodiments, the pins comprise an inorganic coating.

Some embodiments are directed to a method of manufacturing an extrusion die, the method comprising: joining a first plate comprising a first upstream surface and a first downstream surface to a second plate comprising a second upstream surface and a second downstream surface, wherein the first plate is formed of a metal having a first elastic modulus and the first plate comprises a plurality of pins formed between a plurality of slots, the plurality of pins and the plurality of slots defining a discharge face for the extrusion die, and wherein the second plate is formed of at least one of a ceramic material or a metal matrix composite material having a second elastic modulus greater than the first elastic modulus and wherein a plurality of feed holes of the extrusion die extend through the second plate.

In some embodiments, the plurality of feed holes comprise first feedhole portions in the first plate and second feedhole portions in the second plate.

In some embodiments, joining the first plate to the second plate comprises a high temperature bonding method.

In some embodiments, the high temperature bonding method comprises a brazing method.

In some embodiments, the brazing method comprises directly brazing a first upstream surface of the first plate to a second downstream surface of the second plate.

In some embodiments, the brazing method comprises screen printing a brazing paste in a pattern on the second downstream surface of the second plate.

In some embodiments, the pattern comprises a pattern screen printed on the second downstream surface of the second plate around the second feedhole portions of the plurality of feed holes that are formed in the second downstream surface.

In some embodiments, the first material is a stainless steel and the second material is a tungsten carbide-cobalt, and wherein the brazing method comprises brazing the first and second materials together with a first layer of brazing alloy BAg-8, a second layer of brazing alloy BAg-8 and a third layer of a copper brazing material between the first and second layers.

In some embodiments, joining the first plate to the second plate comprises a mechanical fastening method.

In some embodiments, the method further comprises applying an inorganic coating over the pins of the first plate.

Some embodiments are directed to a honeycomb extrusion die, comprising: a first plate comprising: a first upstream surface and a first downstream surface opposite to the first upstream surface; a plurality of pins formed between a plurality of slots, the plurality of pins and the plurality of slots defining a discharge face for the extrusion die at the first downstream surface, and first feedhole portions of a plurality of feed holes of the extrusion die in fluid communication with the plurality of slots, wherein the plurality of slots and the plurality of pins together define a honeycomb geometry, and wherein the first plate is formed of a stainless steel having a first elastic modulus; and a second plate comprising: a second upstream surface and a second downstream surface opposite to the second downstream surface, the second downstream surface being directly brazed to the first upstream surface of the first plate, second feedhole portions of the plurality of feed holes of the extrusion die, wherein the second plate is formed of a material comprising at least one of aluminum oxide or tungsten carbide-cobalt and having a second elastic modulus greater than the first elastic modulus.

In some embodiments, a first average diameter of the first feedhole portions of the plurality of feed holes in the first plate is larger than a second average diameter of the second feedhole portions of the plurality of feed holes in the second plate.

In some embodiments, a first average diameter of the first feedhole portions of the plurality of feed holes in the first plate is in a range of 5% to 15% larger than a second average diameter of the second feedhole portions of the plurality of feed holes in the second plate.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
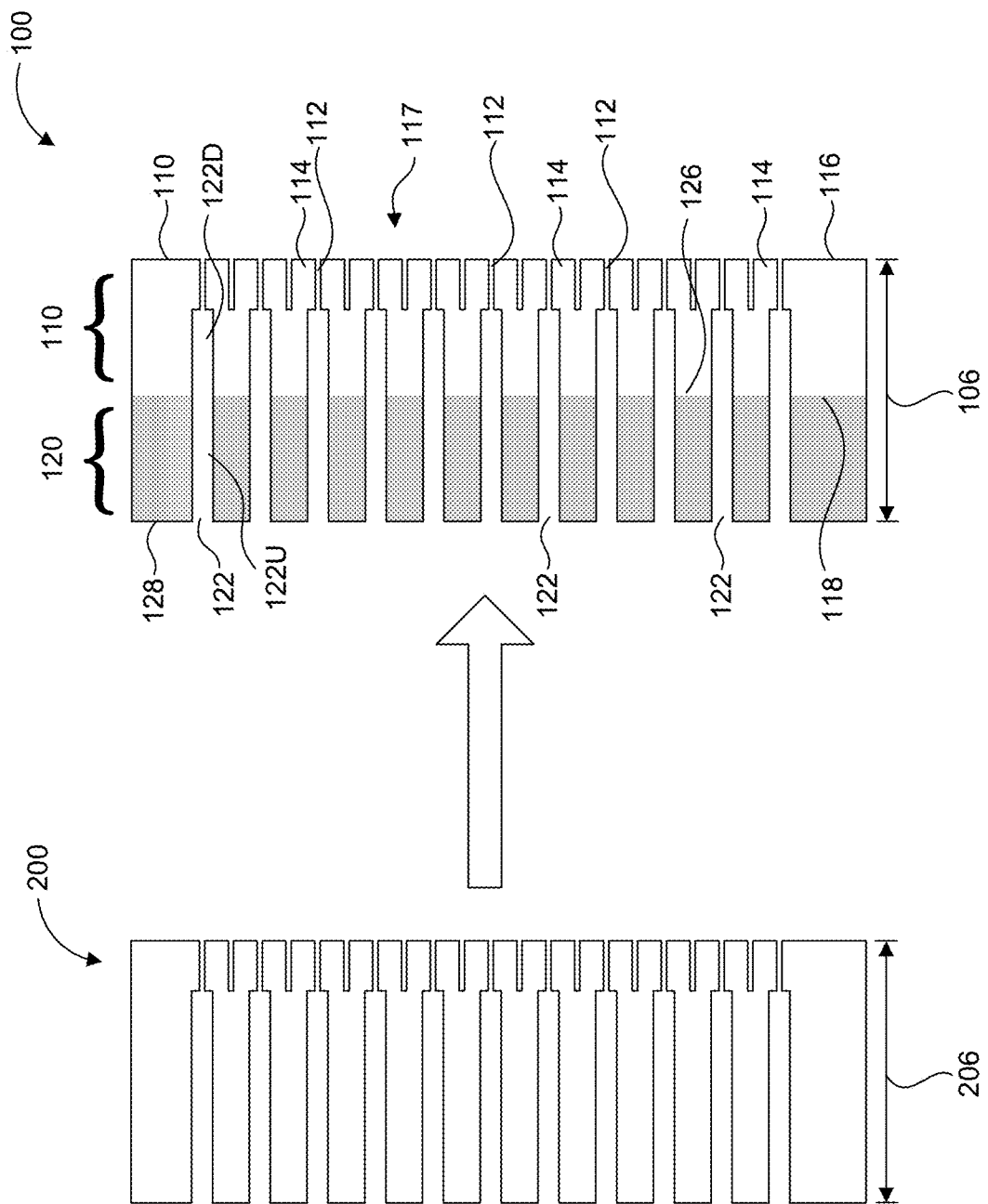
FIG. 1 illustrates a comparison between a cross-section of an exemplary single-material die and a layered extrusion die according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

During an extrusion process, the honeycomb extrusion die may experience elastic deflection caused by high stresses created while forcing a ceramic material though the extrusion die. This elastic deflection can cause flowering, or splaying, of the pins during extrusion. And this flowering may result in a web thickness gradient, from center to periphery, within an extruded honeycomb body. Such a web thickness gradient may be undesirable as it can negatively impact the isostatic strength of a honeycomb body. Extrusion dies having an increased elastic modulus capable of withstanding high extrusion pressure without experiencing pin flowering can improve the quality and performance of extruded honeycomb bodies and can also increase manufacturing yield by consistently forming honeycomb bodies having desired geometries. Extrusion dies according to embodiments described herein utilize a multi-layer structure to inhibit extrusion die deflection during extrusion, thereby reducing or eliminating any negative effects of pin deflection.

Extrusion dies used in the production of ceramic honeycomb bodies, particularly those having larger diameters, are typically subjected to high extrusion pressures during extrusion of the honeycomb bodies. Equation 1, below, illustrates the general stress relationship with key die and process parameters:

$$\sigma \propto \frac{pr^2}{t^2} \quad \text{(Equation 1)}$$

where p represents the applied pressure, r represents the disc span radius of the die, t represents the die thickness, and σ represents the overall stress applied to the die.

To prevent plastic deformation of the extrusion dies due to this pressure while maintaining a relatively small die thickness, the dies are typically made from high yield strength materials, such as stainless steel or other commercial available metal alloys. However, utilizing high-yield strength materials does not prevent elastic deflection, or pin flowering (splaying) because, as illustrated in Equation 2, below, elastic deflection (∂) is inversely proportional to elastic modulus (E).

$$\partial \propto \frac{pr^4}{Et^3}$$ (Equation 2)

To reduce the elastic deflection, the thickness (t) of the die can be increased. However, increasing the die thickness may increase die manufacturing time and exasperate die startup challenges. Reducing elastic deflection is desirable, though, because the pin flowering caused by elastic deflection may result in slot variability, which can cause the overall slot pattern to change significantly throughout the life of the die. This may render the die unusable if it can then only create non-uniform honeycomb bodies. Extrusion dies according to embodiments disclosed herein have a higher effective die elastic modulus compared to an extrusion die formed of only a single material, such as a stainless steel, or other commercially available alloy. The higher effective die elastic modulus reduces or eliminates extrusion die deflection, thereby avoiding potential issues with pin splaying which results in slot variability and non-uniformity in extruded honeycomb bodies.

According to embodiments disclosed herein, to increase the effective elastic modulus of an extrusion die, a metal extrusion die piece is joined with a piece formed of a high-elastic modulus material, for example a ceramic, to create a layered die structure. Because these layered dies include both a high-yield strength material and a high-elastic modulus material, they are capable of decreased extrusion die deflection as well as decreased elastic deformation during an extrusion process. This can result in better slot width uniformity and improved web thickness uniformity for a honeycomb ceramic body extruded using the dies. The layered extrusion dies described herein also provide the potential to reduce die thickness, lower the extrusion pressure, and/or increase the feed rates during extrusion.

Figure 2:
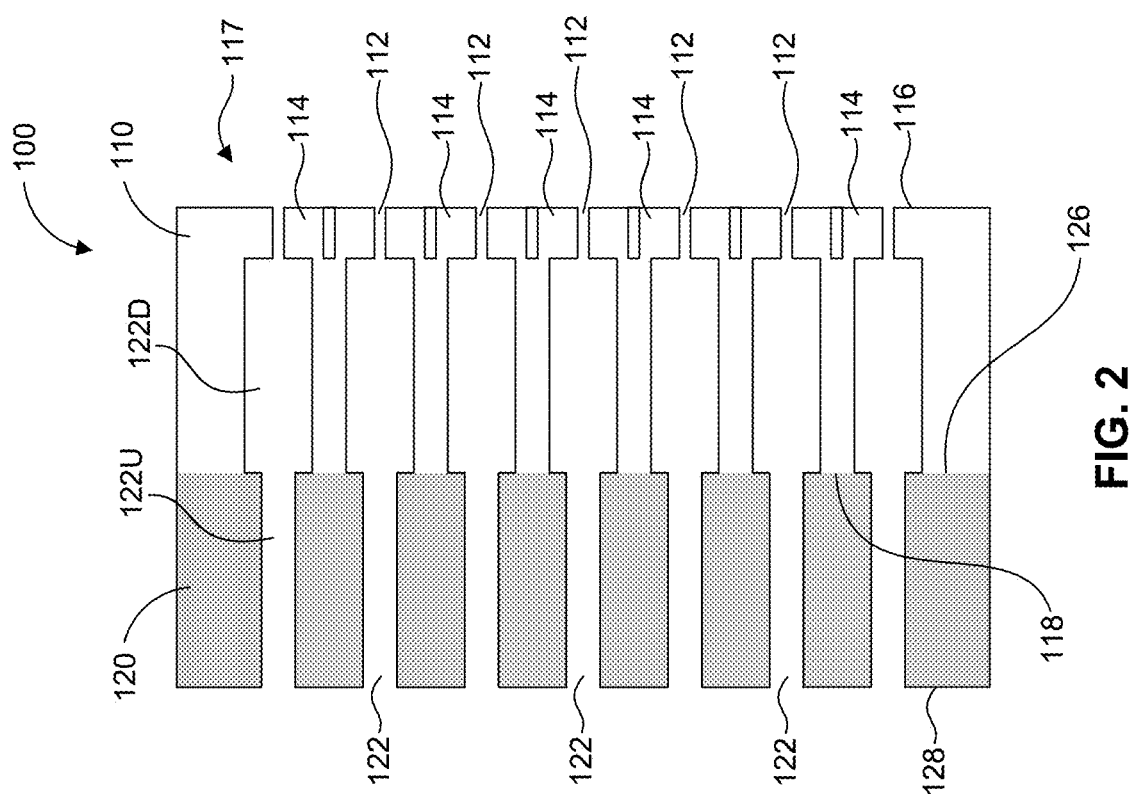
FIG. 2 illustrates a cross-section of an extrusion die according to some embodiments.

FIGS. 1 and 2 illustrate an extrusion die 100 according to some embodiments. Extrusion die 100 includes a first, or downstream, plate 110 and a second, or upstream, plate 120. First plate 110 is formed of a first material. In some embodiments, first plate 110 is formed of a metal alloy. Second plate 120 is formed of a second material different from the first material. In some embodiments, second plate 120 is formed of a ceramic material or a composite material. First plate 110 includes a plurality of pins 114 formed between a plurality of slots 112. At a downstream surface 116 of the first plate 110, pins 114 and slots 112 define a discharge face 117 for the extrusion die 100, through which an extruded body exits die 100. Slots 112 extend into the first plate 110 from the downstream face 116 toward an upstream surface 118 of first plate 110.

In some embodiments, an inorganic coating is disposed over pins 114 of extrusion die 100. The inorganic coating may serve as an abrasion resistant coating for pins 114. The inorganic coating can include titanium carbonitride particles, boron-doped titanium carbonitride particles, boron particles, aluminum titanium nitride particles, titanium aluminum nitride particles, chromium nitride particles, or a combination thereof.

A downstream surface 126 of second plate 120 is joined to the upstream surface 118 of first plate 110. In this arrangement, second plate 120 is joined to the upstream surface 118 of first plate 110, opposite to discharge face 117. As used herein, the terms "upstream" and "downstream" are defined with respect to the extrusion direction in which the extrudate is extruded from extrusion die 100. Opposite the downstream surface 126, the second plate 120 comprises an upstream surface 128. A ceramic-forming mixture (interchangeably a batch, a batch mixture, or a ceramic precursor mixture) can be received by the extrusion die 100 at the surface 128 during extrusion, such that an extrusion direction is defined from the surface 128 toward the discharge surface 117.

Figure 8:
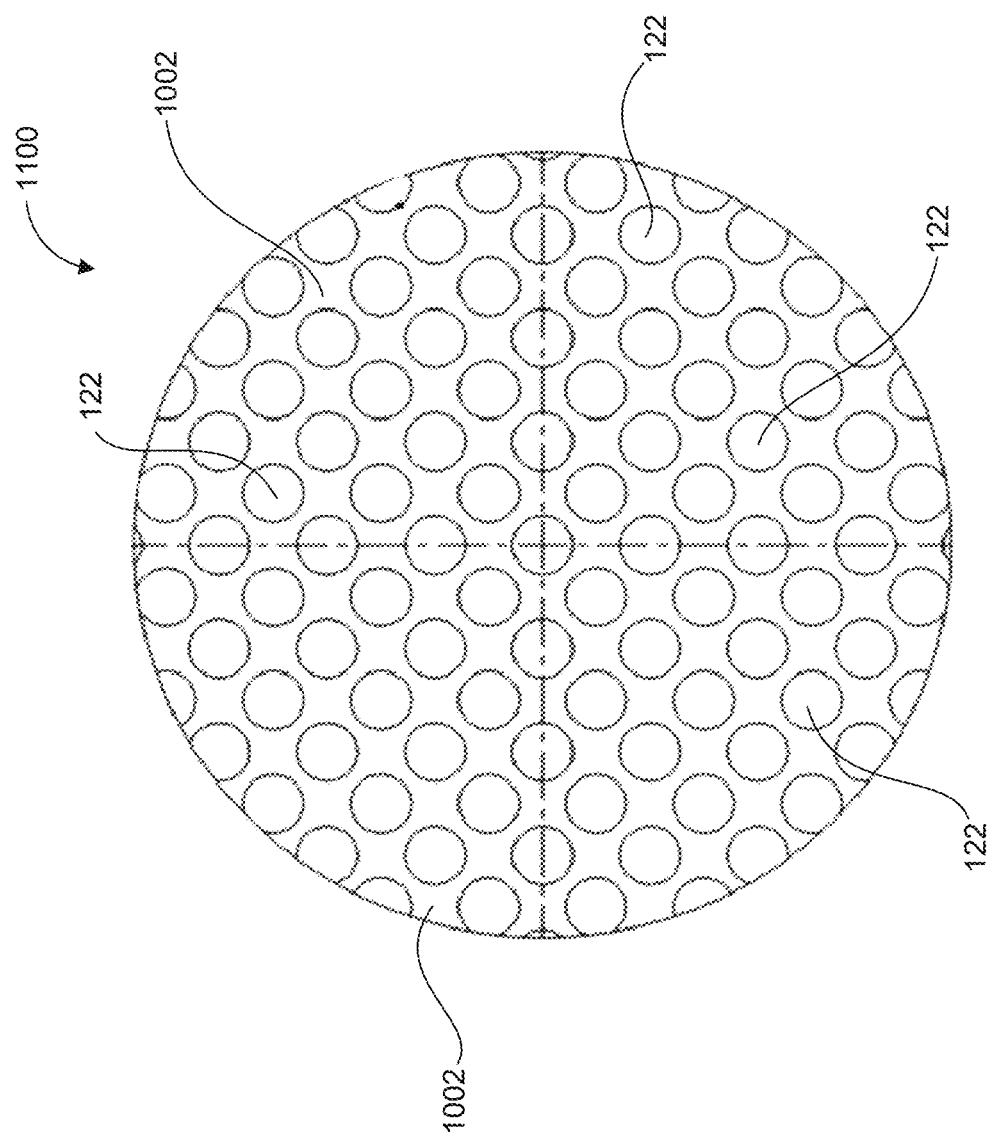
FIG. 8 illustrates a feed hole pattern according to some embodiments.

When first plate 110 is joined to second plate 120, upstream feed hole portions 122U in the upstream plate 120 and downstream feed hole portions 122D in the downstream plate 110 are aligned to form feedholes 122 that extend partially through the extrusion die 100 from the upstream surface 128. Feed holes 122 are in fluid communication with slots 112 of first plate 110. FIG. 8 illustrates an exemplary feed hole pattern on downstream surface 126 (which can be identical to the feedhole pattern on upstream face 128) of second plate 120 according to some embodiments. Feed hole portions 122U extend from upstream surface 128 of second plate 120 to downstream surface 126 of second plate 120. Feed hole portions 122D extend from upstream surface 118 of the first plate 110 toward the downstream surface 116, but terminate after connecting with the slots 112. In some embodiments, feed holes 122 are formed by drilling through second plate 120 and/or first plate 110.

In some embodiments, e.g., as shown in FIG. 1, the cross-sectional flow area, e.g., diameter, of upstream and downstream feedhole portions 122U and 122D are approximately equal. For ease of discussion herein, the cross-sectional flow area of the feedhole portions may be referred to as the diameter thereof, although the feedholes do not necessarily need to have a circular cross-section. In some embodiments, e.g., as shown in FIG. 2, the cross-sectional flow area, e.g., diameter, of the downstream and upstream feedhole portions 122D, 122U are not the same. For example, as shown in FIG. 2, the cross-sectional flow area of downstream feedhole portions 122D is larger than that of the upstream feedhole portions 122U. In such embodiments, the larger size of one set of the feedhole portions 122D or 122U can advantageously assist in alignment of the feedhole portions 122U and 122D, as the mismatch in size accommodates some degree of misalignment between plates 110 and 120 while still maintaining a flow path through the feedholes 122. In some embodiments, as shown in FIG. 2, the downstream feedhole portions 122D are cross-sectionally larger than the upstream feedhole portions 122U. For example, this arrangement minimizes the amount of material that is removed from the second plate 120, and therefore maintains a higher strength for the second plate 120.

In some embodiments, an average diameter of downstream feed hole portions 122D is larger than an average diameter of upstream feed hole portions 122U. In some embodiments, an average diameter of downstream feedhole portions 122D may be in a range of 5% to 15% larger than an average diameter of upstream feed hole portions 122U, including subranges. For example, an average diameter of downstream feedhole portions 122D may be 5% larger than an average diameter of upstream feed hole portions 122U, 6% larger than an average diameter of upstream feed hole portions 122U, 7% larger than an average diameter of upstream feed hole portions 122U, 8% larger than an average diameter of upstream feed hole portions 122U, 9% larger than an average diameter of upstream feed hole portions 122U, 10% larger than an average diameter of upstream feed hole portions 122U, 11% larger than an average diameter of upstream feed hole portions 122U, 12% larger than an average diameter of upstream feed hole portions 122U, 13% larger than an average diameter of upstream feed hole portions 122U, 14% larger than an average diameter of upstream feed hole portions 122U, or 15% larger than an average diameter of upstream feed hole portions 122U, or within a range having any two of these values as endpoints, inclusive of the endpoints.

In some embodiments, an average diameter of downstream feedhole portions 122D is in a range of from greater than or equal to 5% to less than or equal to 15%, such as from greater than or equal to 6% to less than or equal to 14%, from greater than or equal to 7% to less than or equal to 13%, from greater than or equal to 8% to less than or equal to 12%, from greater than or equal to 9% to less than or equal to 11%, and all ranges and sub-ranges between the foregoing values having any two of the above-listed average diameter values, including the endpoints.

This difference in diameter may be beneficial, as the relatively smaller diameter of upstream feed hole portions 122U can assist in avoiding the plates 110, 120 partially blocking the flow paths through the feedholes 122 that can occur if the diameters of the feedhole portions are the same and there is misalignment between first plate 110 and second plate 120 during joining.

In some embodiments, the average diameter of upstream feed hole portions 122U is in a range of 0.01 inches to 0.09 inches, or more preferably, in a range of 0.03 inches to 0.08 inches. In some embodiments, the average diameter of downstream feedhole portions 122D may be in a rage of 0.02 inches to 0.1 inches, or more preferably, in a range of 0.04 inches to 0.09 inches. In some embodiments, the average diameter of upstream feed hole portions 122U is equal to the average diameter of downstream feedhole portions 122D.

In some embodiments, an average diameter of upstream feed hole portions 122U is in a range of from greater than or equal 0.01 inches to less than or equal to 0.09 inches, such as from greater than or equal to 0.02 inches to less than or equal to 0.08 inches, from greater than or equal to 0.03 inches to less than or equal to 0.07 inches, from greater than or equal to 0.04 inches to less than or equal to 0.06 inches, and all ranges and sub-ranges between the foregoing values having any two of the above-listed average diameter values as endpoints, including the endpoints.

In some embodiments, an average diameter of downstream feedhole portions 122D is in a range of from greater than or equal 0.02 inches to less than or equal to 0.1 inches, such as from greater than or equal to 0.03 inches to less than or equal to 0.09 inches, from greater than or equal to 0.04 inches to less than or equal to 0.08 inches, from greater than or equal to 0.05 inches to less than or equal to 0.07 inches, and all ranges and sub-ranges between the foregoing values having any two of the above-listed average diameter values as endpoints, including the endpoints.

In some embodiments, first plate 110 is made of a stainless steel. However, any high-yield strength metal suitable for use in extrusion dies can be used. In some embodiments, second plate 120 is made of a ceramic material, for example aluminum oxide. In some embodiments, second plate 120 is made of a metal matrix composite, for example tungsten carbide-cobalt (WC-Co). By selecting first plate 110 of a first material and second plate 120 of a second material, a second elastic modulus of the second material of second plate 120 can be set so that it is greater than a first elastic modulus of the first material of first plate 110. When selecting materials, Equation 3, below, can be considered to evaluate stresses that may develop when joining the two materials, e.g., to assess whether the stresses will be maintained acceptably low levels. In Equation 3, $\sigma_1$ represents the stress developed in a first material, $\sigma_2$ represents the stress developed in a second material, $E_1$ represents the elastic modulus of the first material, $E_2$ represents the elastic modulus of the second material, $\alpha_1$ represents the coefficient of thermal expansion of the first material, $\alpha_2$ represents the coefficient of thermal expansion of the second material, $T_B$ represents the bonding temperature for the joining process, and $T_0$ represents the temperature of the atmosphere in which the bonding process is performed.

$$\sigma_1 = -\sigma_2 = \frac{E_1 E_2}{E_1 + E_2}(a_1 - a_2)(T_B - T_0) \qquad \text{(Equation 3)}$$

In some embodiments, the second elastic modulus is 50% or more greater than the first elastic modulus. For example, the second elastic modulus may be 50% greater than the first elastic modulus, 60% greater than the first elastic modulus, 70% greater than the first elastic modulus, 80% greater than the first elastic modulus, 90% greater than the first elastic modulus, 100% greater than the first elastic modulus, 110% greater than the first elastic modulus, 120% greater than the first elastic modulus, 130% greater than the first elastic modulus, 140% greater than the first elastic modulus, 150% greater than the first elastic modulus, 160% greater than the first elastic modulus, 170% greater than the first elastic modulus, 180% greater than the first elastic modulus, 190% greater than the first elastic modulus or 200% greater than the first elastic modulus, or within a range having any two of these values as endpoints, inclusive of the endpoints.

In some embodiments, the second elastic modulus is in a range of from greater than or equal 50% greater than the first elastic modulus to less than or equal to 200% greater than the first elastic modulus, such as from greater than or equal to 60% to less than or equal to 190%, from greater than or equal to 70% to less than or equal to 180%, from greater than or equal to 80% to less than or equal to 170%, from greater than or equal to 80% to less than or equal to 160%, from greater than or equal to 90% to less than or equal to 150%, from greater than or equal to 100% to less than or equal to 140%, from greater than or equal to 110% to less than or equal to 130%, and all ranges and sub-ranges between the foregoing values having any two of the above-listed elastic modulus values as endpoints, including the endpoints.

In some embodiments, the first elastic modulus for the material of first plate 110 is in a range of 150 to 250 GPa. In some embodiments, the second elastic modulus for the material of second plate 120 is in a range of 300 to 600 GPa.

In some embodiments, an effective die elastic modulus of a layered extrusion die 100 is 250 GPa or more. For example, an effective die elastic modulus of die 100 can be greater than or equal to 250 GPa, 300 GPa, 350 GPa, 400 GPa, 450 GPa, 500 GPa, or 550 GPa, or even 600 GPa, or within a range having any two of these values as endpoints, inclusive of the endpoints.

In some embodiments, the die elastic modulus is in a range of from greater than or equal 250 GPa to less than or equal to 600 GPa, such as from greater than or equal to 300 GPa to less than or equal to 550 GPa, from greater than or equal to 350 GPa to less than or equal to 500 GPa, from greater than or equal to 400 GPa to less than or equal to 450 GPa, and all ranges and sub-ranges between the foregoing values having any two of the above-listed elastic modulus values as endpoints, including the endpoints.

The elastic moduli of any of the materials described herein may be measured through tensile testing, for example using an Instron® machine according to ASTM E8/E8M. As used herein, the term "effective die elastic modulus" ($E_{composite}$), or simply "die elastic modulus" when referring to the die 100, means the elastic modulus of a layered extrusion die calculated using the rule of mixtures equation (Equation 4) provided below:

$$E_{composite}=E1*V1+E2*V2 \qquad \text{(Equation 4)}$$

where (V1+V2)=1, V1 is the volume fraction of the first material (volume of the first material divided by the sum of the volumes of both the first and second materials), V2 is the volume fraction of the second material (volume of the second material divided by the sum of the volumes of both the first and second materials), E1 is the elastic modulus of the first material, and E2 is the elastic modulus of the second material.

Because a layered extrusion die as described herein has an effective die elastic modulus much larger than that of stainless steel or similar extrusion die metals (e.g., approximately 200-220 GPa), pin flowering may be avoided. As a result, extrusion pressure through a die may be reduced. Reducing the extrusion pressure through the die may facilitate use of larger diameter dies. Second, web thickness uniformity within extruded bodies may be maintained. Third, the amount of pin deflection may be minimized, resulting in improved die slot width uniformity. Fourth, die thickness can be reduced while maintaining sufficient strength for handling extrusion pressures. That is, since the layered extrusion dies disclosed herein comprise a metal plate, the yield strength of the die can remain high, allowing for a reduced die thickness. For example, as shown in FIG. 1, a thickness 106 of extrusion die 100 may be equal to, or less than a thickness 206 of an all-metal extrusion die 200 having the same diameter and pin/slot dimensions and configuration. Fifth, feed rates of extrusion material through a die can be increased.

In some embodiments, extrusion die 100 has a diameter in a range of 9.25 inches to 18.25 inches, including subranges. For example, extrusion die 100 may have a diameter of 9.25 inches, 10 inches, 10.5 inches, 11 inches, 11.5 inches, 12 inches, 12.5 inches, 13 inches, 13.5 inches, 14 inches, 14.5 inches, 15 inches, 15.5 inches, 16 inches, 16.5 inches, 17 inches, 17.5 inches, 18 inches, or 18.25 inches, or within a range having any two of these values as endpoints, inclusive of the endpoints.

For example, in some embodiments, the diameter of extrusion die 100 is in a range of from greater than or equal to 9.25 inches to less than or equal to 18.25 inches, such as from greater than or equal to 10 inches to less than or equal to 18 inches, from greater than or equal to 10.5 inches to less than or equal to 17.5 inches, from greater than or equal to 11 inches to less than or equal to 17 inches, from greater than or equal to 11.5 inches to less than or equal to 16.5 inches, from greater than or equal to 12 inches to less than or equal to 16 inches, from greater than or equal to 12.5 inches to less than or equal to 15.5 inches, from greater than or equal to 13 inches to less than or equal to 15 inches, from greater than or equal to 13.5 inches to less than or equal to 14.5 inches, and all ranges and sub-ranges between the foregoing values having any two of the above-listed average diameter values as endpoints, including the endpoints.

As discussed above, the first and second materials can be selected so that a CTE mismatch between the material of first plate 110 and the material of second plate 120 remains small, which minimizing stresses at the interface between first plate 110 and second plate 120. For example, in some embodiments, a CTE of the material of second plate 120 is equal to a CTE of the material of first plate 110±50%. The CTE of the materials from first plate 110 and second plate 120 may be measured according to ASTM E228.

In some embodiments, first plate 110 is directly joined to second plate 120. As used herein, a first component described as "joined to" a second component means that the components are attached to each other, either by direct or indirect contact. A first component described as "directly joined to" a second component means that a surface of the first component is in direct contact with a surface of the second component and/or a surface of the first component is directly attached to a surface of the second component via one or more bonding layers (e.g., a brazing layer) with no other intervening layers or components between the two surfaces. In some embodiments, upstream surface 118 of first plate 110 is directly joined to downstream surface 126 of second plate 120.

In some embodiments, first plate 110 and second plate 120 are joined using a high temperature bonding method, for example a brazing method. In some embodiments, the brazing method includes brazing upstream surface 118 of first plate 110 to downstream surface 126 second plate 120. In some embodiments, the brazing method comprises the use of a screen printing process. In some embodiments, the screen printing process comprises printing a brazing paste in a pattern on a surface of second plate 120 around upstream feed hole portions 122U formed in the downstream surface 126 of second plate 120. For example, in some embodiments, as shown in FIG. 8, brazing paste 1002 is printed in a pattern 1100 around the upstream feed hole portions 122U formed in second plate 120. In some embodiments, the screen printing process comprises printing a brazing paste in a pattern on the upstream surface 118 of first plate 110 around downstream feedhole portions 122D. After the brazing paste is printed onto second plate 120 and/or first plate 110, second plate 120 can be joined with first plate 110 using a suitable thermal treatment process. Such a screen printing and brazing process can allow for a precise application of brazing paste to create a stronger bond between first plate 110 and second plate 120. In some embodiments, brazing paste 1002 is screen printed onto a surface of second plate 120 using a silk screen printing process.

In some embodiments, first plate 110 and second plate 120 are joined using a mechanical fastening method. For example, first plate 110 and second plate 120 can be joined by screws or bolts configured to secured first plate 110 to second plate 120, and vice versa. In some embodiments, first plate 110 and second plate 120 are joined using diffusion bonding. In some embodiments, first plate 110 and second plate 120 are joined via a mechanical interlock between one or more first features on first plate and one or more second features of second plate. The first and second features may be, for example, track and grooves, or lug and slot (e.g., similar to a bayonet-type connect) configured to engage each other when coupled together (e.g., by engaging the surfaces 118 and 126 and then sliding or rotating the plates 110 and 120 with respect to each other). In some embodiments, first plate 110 and second plate 120 are joined by two or more of the joining processes described herein. For example, first plate 110 and second plate 120 may be joined by a brazing method and by a mechanical fastening method.

EXAMPLES

Embodiments will be further clarified in the following examples. It should be understood that these examples are not limiting to the embodiments described above. Testing was conducted to determine appropriate materials for forming second plate 120 in a layered extrusion die 100 according to embodiments described herein.

Based on the above-listed criteria, two ceramics ($Al_2O_3$ (aluminum oxide) and $Si_3N_4$ (silicon nitride)) and one metal matrix composite (WC-Co) were selected for the material of plate 120. The material of plate 110 for all tests was stainless steel.

Compatibility between the first and second materials to undergo a brazing process was first assessed. $Si_3N_4$ was ruled out because it had too high of a CTE mismatch with stainless steel, which was considered problematic for a brazing process.

Figure 3:
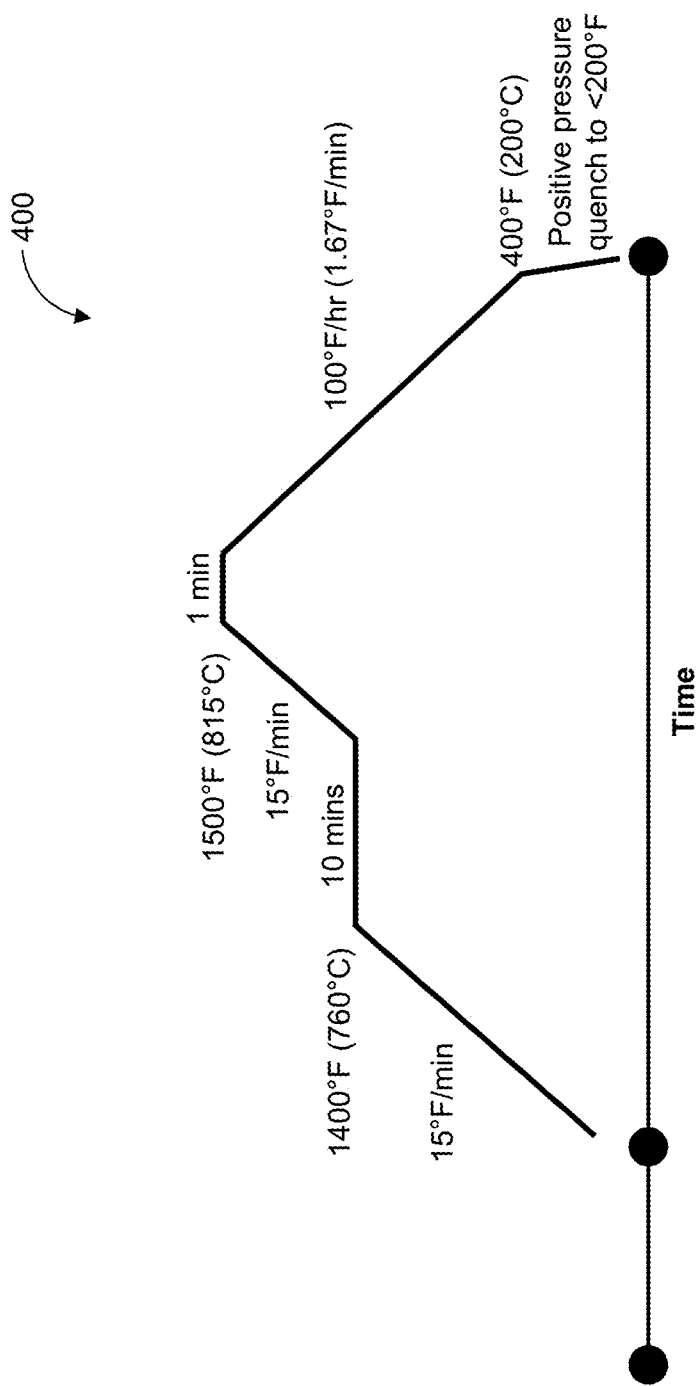
FIG. 3 is a representation of a first procedure for joining a first test piece to a second test piece.
Figure 4:
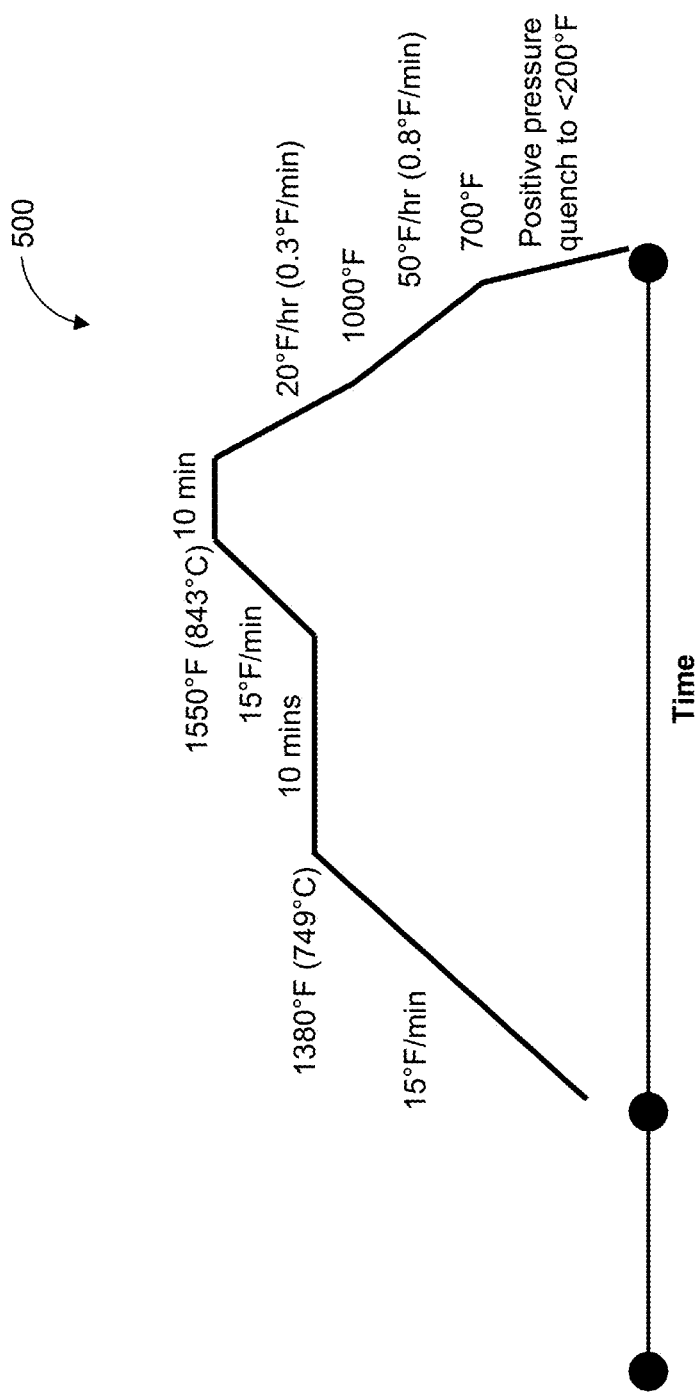
FIG. 4 is a representation of a second procedure for joining a first test piece to a second test piece.

FIGS. 3 and 4 are representations of procedures to join high modulus materials to test pieces of stainless steel. Graphical representation 400 shows the temperatures and time periods of heating and cooling for joining a WC-Co test piece to a stainless steel test piece. Graphical representation 500 shows the temperatures and time periods of heating and cooling for joining an $Al_2O_3$ test piece to a stainless steel test piece.

To join the WC-Co test piece to the stainless steel test piece, brazing paste was first applied to the test pieces. The test pieces were then heated to 1400° F. at a rate of 15° F./min, and were then held at 1400° F. for ten minutes. Subsequently, the test pieces were heated to 1500° F. at a rate of 15° F./min, and were then held for one minute at 1500° F., before cooling to 400° F. at a rate of 100° F./hour and quenching.

Similarly, to join the $Al_2O_3$ test piece to the stainless steel test piece, brazing paste was first applied to the test pieces. The test pieces were then heated to 1380° F. at a rate of 15° F./min, and were then held at 1380° F. for ten minutes. Subsequently, the test pieces were heated to 1550° F. at a rate of 15° F./min, and were then held for ten minutes at 1550° F., before cooling to 1000° F. at a rate of 20° F./hour, and then to 700° F. at a rate of 50° F./hour, and quenching.

Figure 5:
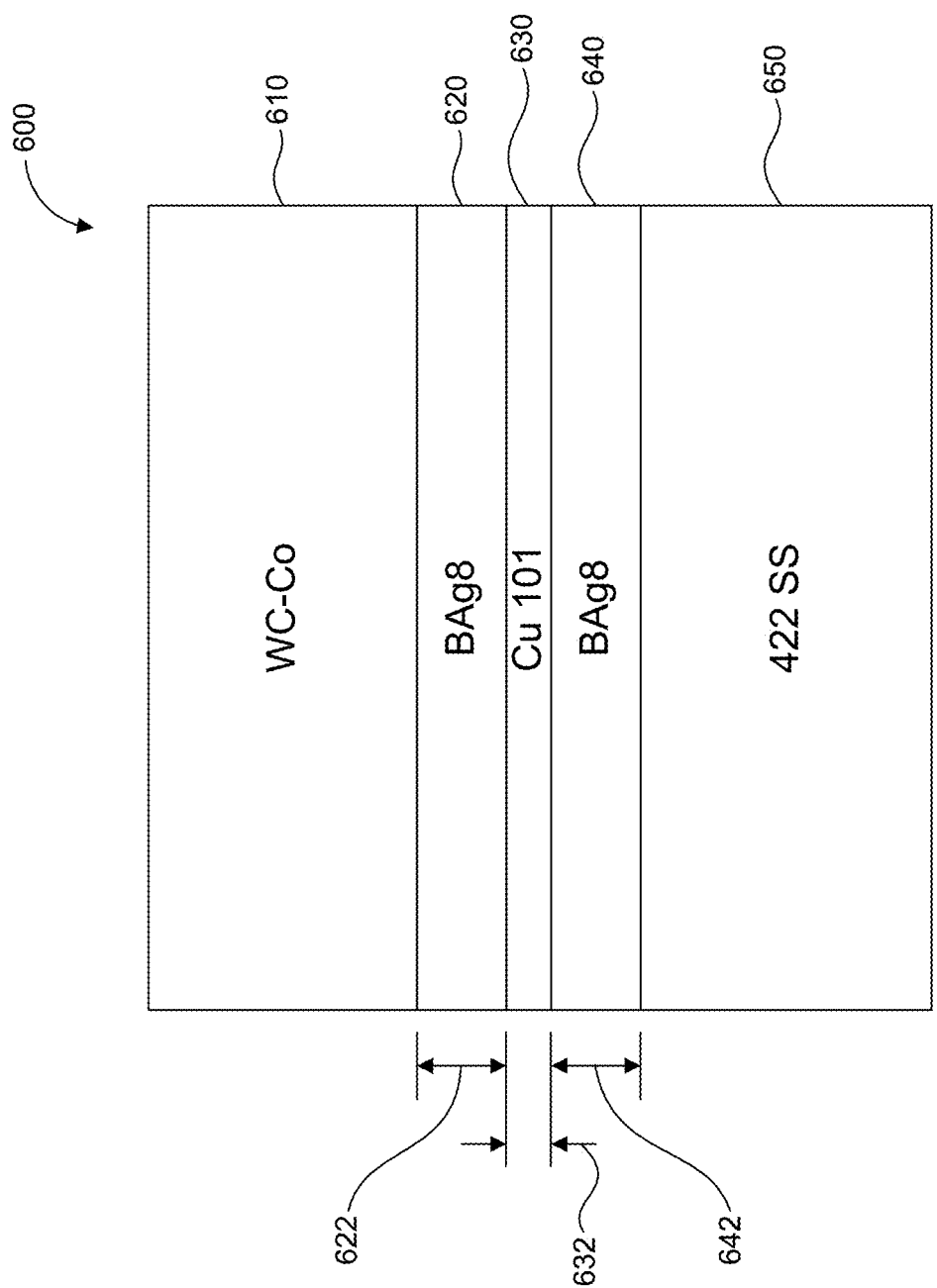
FIG. 5 illustrates a cross-section of a brazed joint according to some embodiments.
Figure 6:
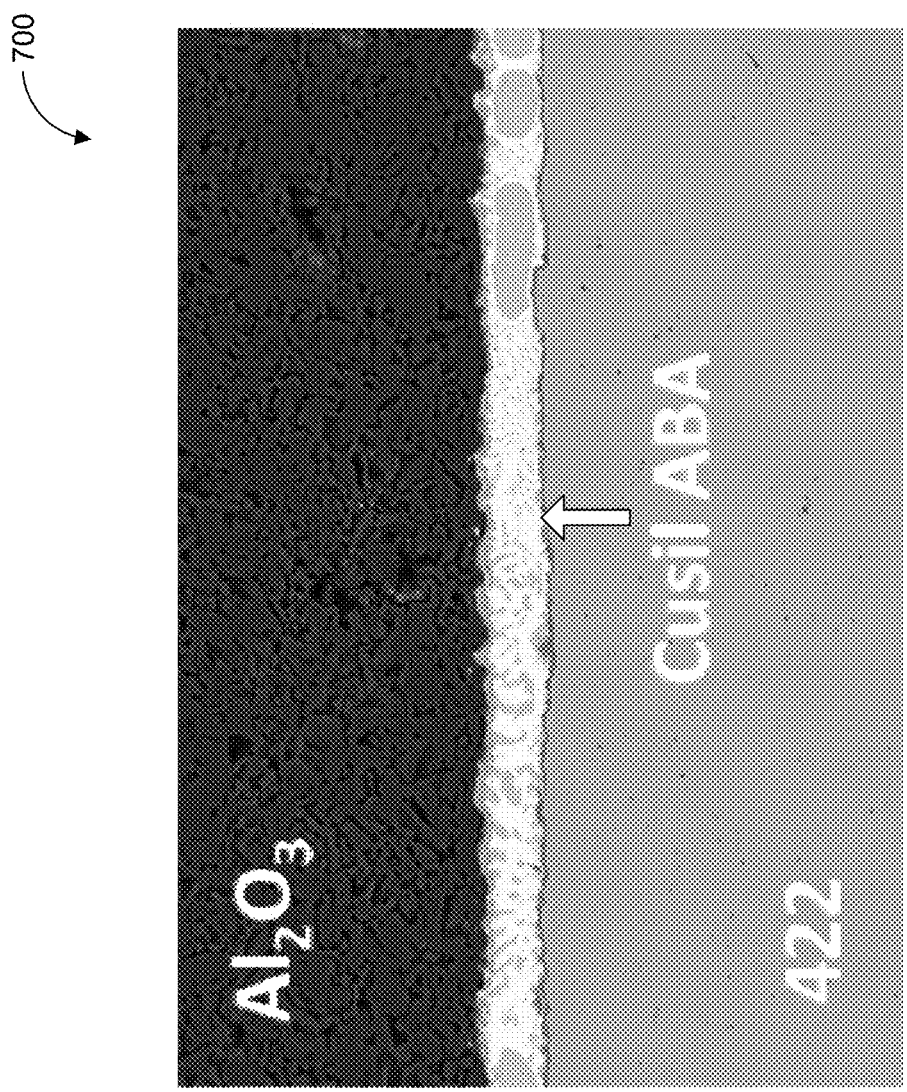
FIG. 6 illustrates a cross-section of a brazed joint according to some embodiments.
Figure 7C:
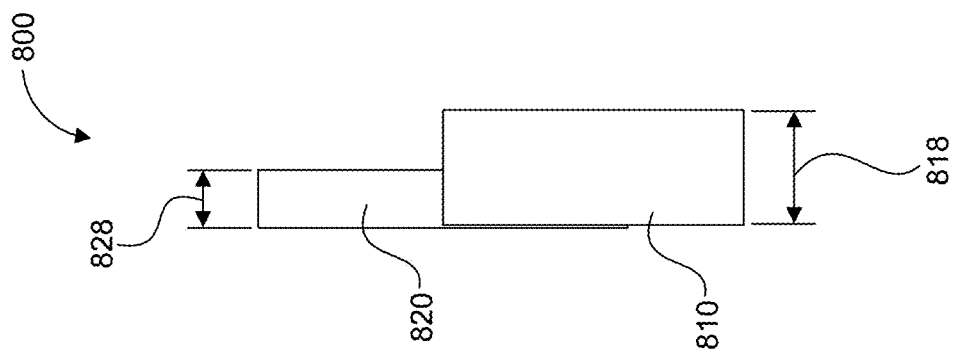
FIGS. 7A-7C illustrate test pieces for strength testing.
Figure 7B:
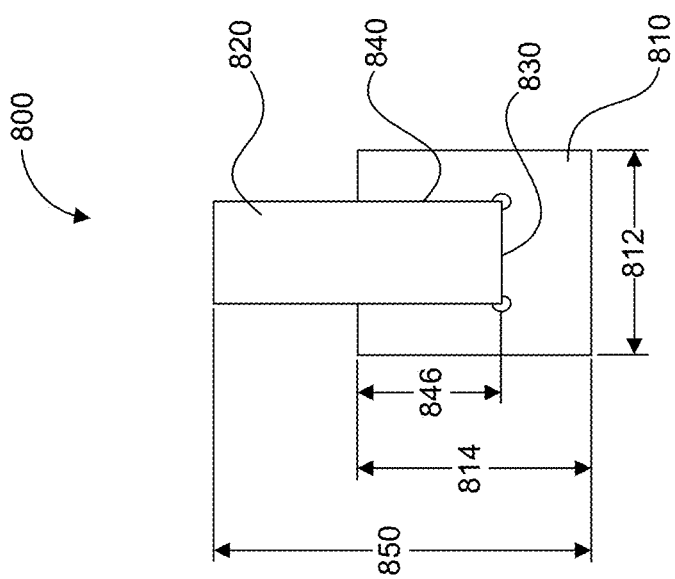
Figure 7A:
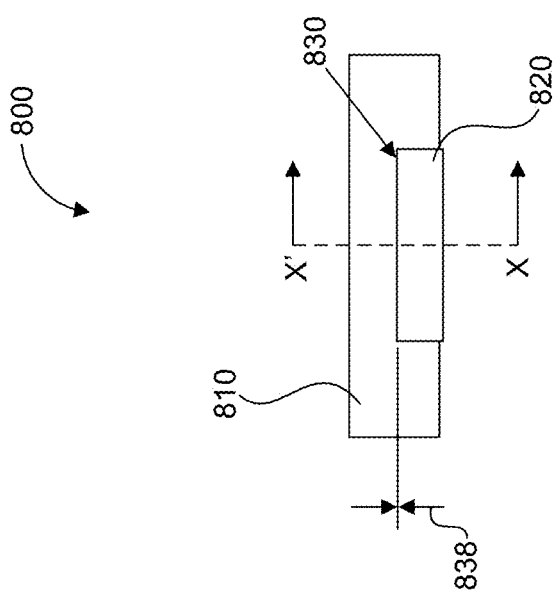

Cross-sections of the brazing alloys along line X-X' in FIG. 7A are shown in FIGS. 5 and 6. To join the WC-Co test piece to the stainless steel test block, a BAg8 brazing alloy was used as shown in FIG. 6. Brazing setup 600 shows the BAg8 brazing alloy disposed between the two test pieces 610 and 650. The brazing setup 600 comprises two layers 620 and 640 of BAg8 and a Cu 101 (copper 101) layer 630 disposed between the BAg8 layers. BAg8 layers 620 and 640 had thicknesses 622 and 642 of 0.0020 inches, and the Cu 101 layer 630 had a thickness 632 of 0.0015 inches. The overall composition of the BAg8 brazing alloy was 72 wt. % Ag (silver) and 28 wt. % Cu (copper). The BAg8 brazing alloy had a liquidus temperature of 1435° F. In some embodiments, the addition of Cu 101 layer 630 can advantageously enable brazing at lower temperatures than those possible when using only the BAg8 brazing alloy.

To join the $Al_2O_3$ test piece to the stainless steel test block, a Cusil ABA braze alloy was used as shown in brazing setup 700 of FIG. 6. The Cusil ABA braze alloy had a composition of 63.0±1.0 wt. % Ag (silver), 35.25±0.5 wt. % Cu (copper), and 1.75 wt. % Ti (titanium). The Cusil ABA braze alloy had a liquidus temperature of 1500° F.

The above-described WC-Co/stainless steel and $Al_2O_3$/stainless steel samples were configured as illustrated in FIGS. 8A-8C. FIGS. 8A-8C illustrate various views of a test sample 800. Test sample 800 includes a first piece 810, which represents the stainless steel test pieces, and a second piece 820, which represents the WC-Co and $Al_2O_3$ test pieces. A brazing paste 830 (e.g., according to the brazing set up 600 or 700) was applied at an interface between first piece 810 and second piece 820 at a thickness 838 in a range of 0.001 inches to 0.010 inches.

In the tests, first piece 810 had a width 812 of 3.25 inches, a height 814 of 3.25 inches, and a thickness 818 of 1 inch. Second piece 820 had a thickness 828 of 0.50 inches. First piece 810 includes an indentation 840 into which second piece 820 was placed when it is joined with first piece 810. Indentation 840 had a depth 846 of 2 inches. Test sample 800 had an overall height 850 of 5.25 inches.

Brazed test pieces were tested using Instron® equipment. Prior to testing, a test sample of a given material was inserted into a lower holding apparatus and attached to an upper holding apparatus. A bolt was used to secure the test sample to the upper holding apparatus via a hole drilled through test sample. If the sample fails prematurely during tensile testing, the brazing setup is considered insufficient. In tests performed, the WC-Co samples performed superiorly, i.e., stayed intact under a tensile load of over 15,000 pounds, indicating the strength of the braze between WC-Co and stainless steel is suitable for use in joining layers made of these materials for an extrusion die.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Where a range of numerical values is recited herein, comprising upper and lower values, unless otherwise stated in specific circumstances, the range is intended to include the endpoints thereof, and all integers and fractions within the range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A honeycomb extrusion die, comprising:
    a first metal plate having a first upstream surface and a first downstream surface, the first metal plate formed of a first material having a first elastic modulus and comprising a plurality of pins formed between a plurality of slots, the plurality of pins and the plurality of slots defining a discharge face for the honeycomb extrusion die at the first downstream surface of the first metal plate;
    a second plate having a second upstream surface and a second downstream surface, wherein the second plate is joined at the second downstream surface to the first upstream surface of the first metal plate, the second plate being formed of a second material having a second elastic modulus; and
    a plurality of feed holes extending from the second upstream surface of the second plate through the honeycomb extrusion die into communication with the plurality of slots,
    wherein the second material comprises a metal matrix composite material or a ceramic material, and
    wherein the second elastic modulus is greater than the first elastic modulus.

2. The honeycomb extrusion die of claim 1, wherein the plurality of feed holes comprise first feedhole portions in the first metal plate and second feedhole portions in the second plate.

3. The honeycomb extrusion die of claim 2, wherein:
    the plurality of slots extend from the first downstream surface of the first metal plate toward the first upstream surface of the first metal plate, and the first feedhole portions of the plurality of feed holes in the first metal plate extend from the first upstream surface of the first metal plate toward the first downstream surface of the first metal plate; and
    the second feedhole portions of the plurality of feed holes in the second plate extend through the second plate from the second upstream surface of the second plate to the second downstream surface of the second plate.

4. The honeycomb extrusion die of claim 3, wherein the first upstream surface of the first metal plate is directly joined to the second downstream surface of the second plate.

5. The honeycomb extrusion die of claim 2, wherein a first average diameter of the first feedhole portions of the plurality of feed holes in the first metal plate is larger than a second average diameter of the second feedhole portions of the plurality of feed holes in the second plate.

6. The honeycomb extrusion die of claim 2, wherein a first average diameter of the first feedhole portions of the plurality of feed holes in the first metal plate is in a range of 5% to 15% larger than a second average diameter of the second feedhole portions of the plurality of feed holes in the second plate.

7. The honeycomb extrusion die of claim 1, wherein the second elastic modulus is 50% or more greater than the first elastic modulus.

8. The honeycomb extrusion die of claim 1, wherein the second material comprises the ceramic material and the ceramic material is aluminum oxide.

9. The honeycomb extrusion die of claim 1, wherein the second material comprises the metal matrix composite material and the metal matrix composite material is tungsten carbide-cobalt.

10. The honeycomb extrusion die of claim 1, further comprising an effective die elastic modulus of 250 GPa or more.

11. The honeycomb extrusion die of claim 1, wherein a coefficient of thermal expansion of the second material is from 50% to 150% of a coefficient of thermal expansion of the first material.

12. A honeycomb extrusion die, comprising:
    a first metal plate having a first upstream surface and a first downstream surface, the first metal plate formed of a first material having a first elastic modulus and comprising a plurality of pins formed between a plurality of slots, the plurality of pins and the plurality of slots defining a discharge face for the honeycomb extrusion die at the first downstream surface of the first metal plate;
    a second plate having a second upstream surface and a second downstream surface, wherein the second plate is joined at the second downstream surface to the first upstream surface of the first metal plate, the second plate being formed of a second material having a second elastic modulus; and
    a plurality of feed holes extending from the second upstream surface of the second plate through the honeycomb extrusion die into communication with the plurality of slots, wherein the second material comprises a metal matrix composite material, and wherein the second elastic modulus is greater than the first elastic modulus.

13. A honeycomb extrusion die, comprising:

a first metal plate having a first upstream surface and a first downstream surface, the first metal plate formed of a first material having a first elastic modulus and comprising a plurality of pins formed between a plurality of slots, the plurality of pins and the plurality of slots defining a discharge face for the honeycomb extrusion die at the first downstream surface of the first metal plate;

a second plate having a second upstream surface and a second downstream surface, wherein the second plate is joined at the second downstream surface to the first upstream surface of the first metal plate, the second plate being formed of a second material having a second elastic modulus; and a plurality of feed holes extending from the second upstream surface of the second plate through the honeycomb extrusion die into communication with the plurality of slots, wherein the second material comprises a ceramic material, and wherein the second elastic modulus is greater than the first elastic modulus.

* * * * *